(No Model.) 2 Sheets—Sheet 1.

H. SNELL.
WATER FILTER.

No. 606,592. Patented June 28, 1898.

Witnesses
J. P. Appleman
A. M. Wilson

Inventor
Henry Snell.
by Henry C. Evert
Attorney (No Model.) 2 Sheets—Sheet 2.
H. SNELL.
WATER FILTER.
No. 606,592. Patented June 28, 1898.
Fig. 3.
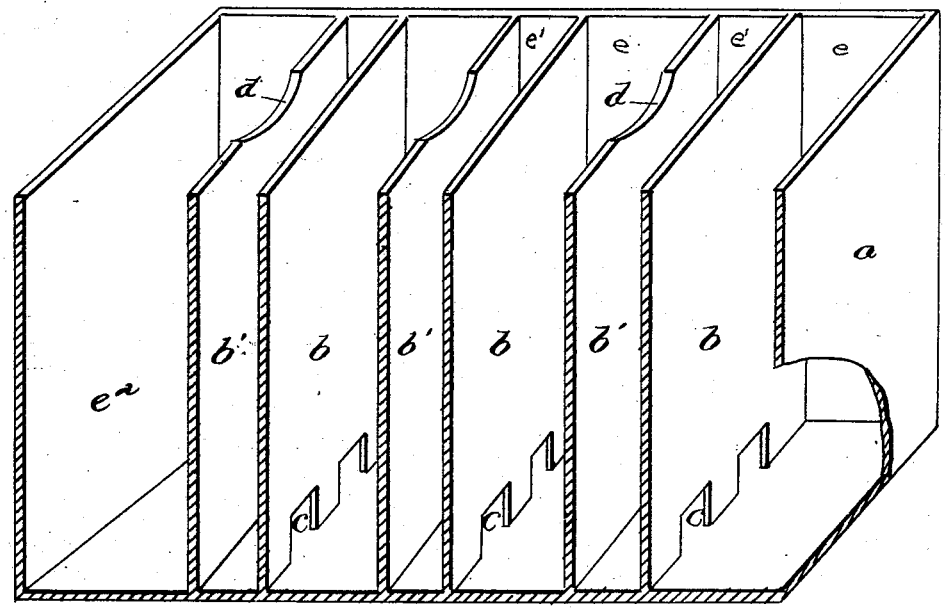
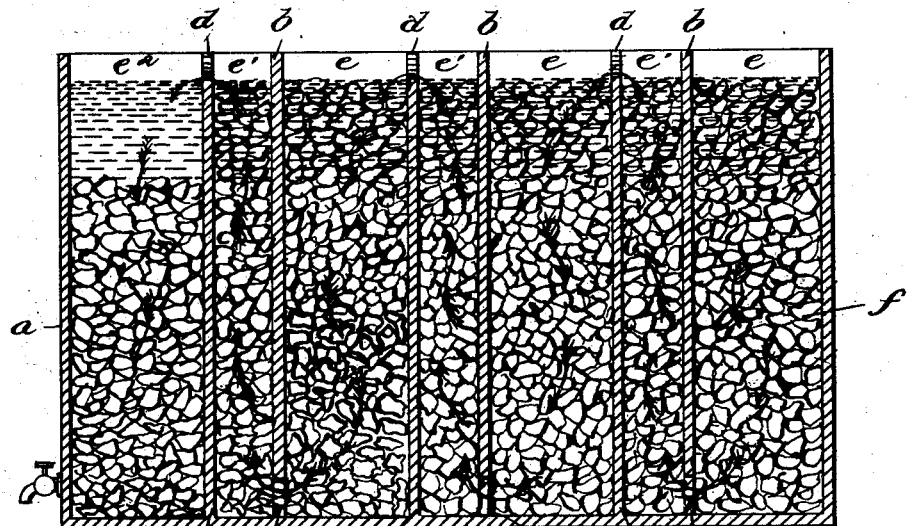
Fig. 4.
Witnesses
J. P. Appleman
A. M. Wilson
Inventor
Henry Snell.
by Henry C. Evert
Attorney

UNITED STATES PATENT OFFICE.

HENRY SNELL, OF PITTSBURG, PENNSYLVANIA.

WATER-FILTER.

SPECIFICATION forming part of Letters Patent No. 606,592, dated June 28, 1898.

Application filed September 23, 1897. Serial No. 652,707. (No model.)

*To all whom it may concern:*

Be it known that I, HENRY SNELL, a citizen of the United States of America, residing at Pittsburg, in the county of Allegheny and State of Pennsylvania, have invented certain new and useful Improvements in Water-Filters, of which the following is a specification, reference being had therein to the accompanying drawings.

This invention relates to certain new and useful improvements in water-filters, and has for its object to construct a filter having a series of compartments each of which, with the exception of the filtered-water receptacle, is filled with gravel, limestone, charcoal, chipped granite, or any other suitable material, through which the water is permitted to flow downward in the one receptacle and upward in the succeeding one, so that all impurities that may be contained in the same will be eliminated therefrom by the time the water reaches the receptacle for holding the same.

The invention consists, further, in the extreme simplicity of construction and in the manner in which each receptacle may be thoroughly cleansed when desired without removing any of the filtering substances contained therein, and also providing a means for thoroughly washing the impurities out of the filtering substances without interfering in any manner with the receptacle for the filtered water.

The invention further consists in the novel construction, combination, and arrangement of parts to be hereinafter more specifically described, and particularly pointed out in the claims.

In describing the invention in detail reference is had to the accompanying drawings, forming a part of this specification, and wherein like letters of reference indicate similar parts throughout the several views, in which—

Figure 1:
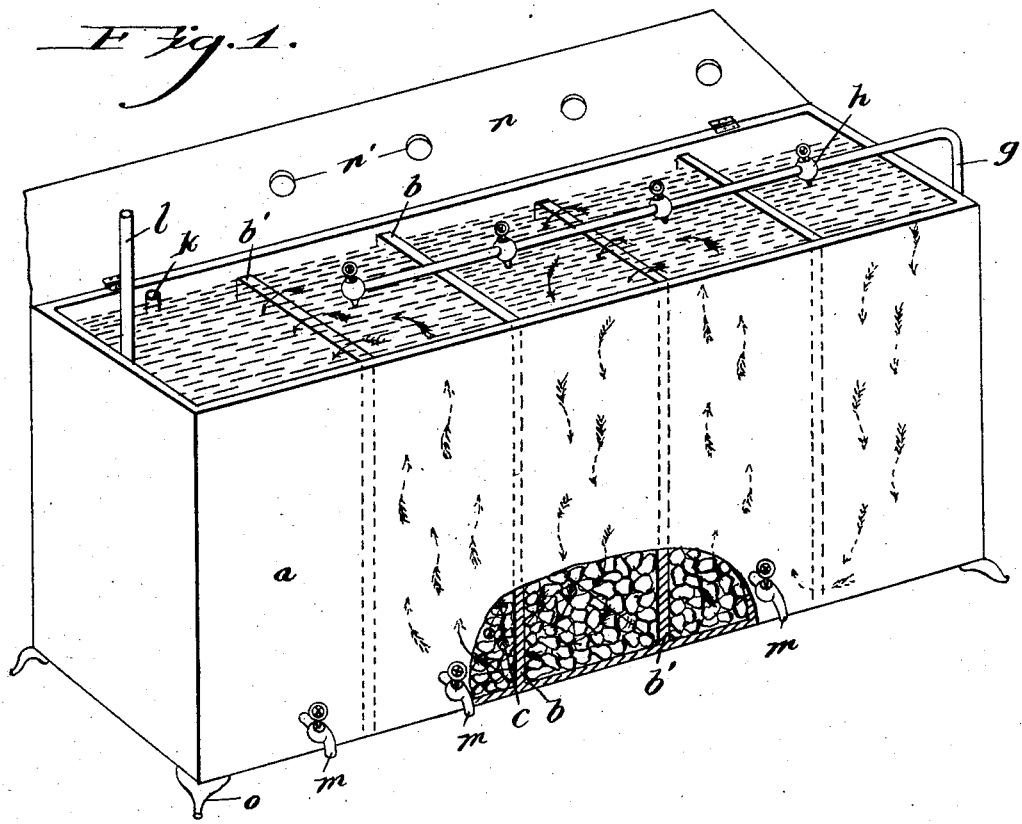
Figure 2:
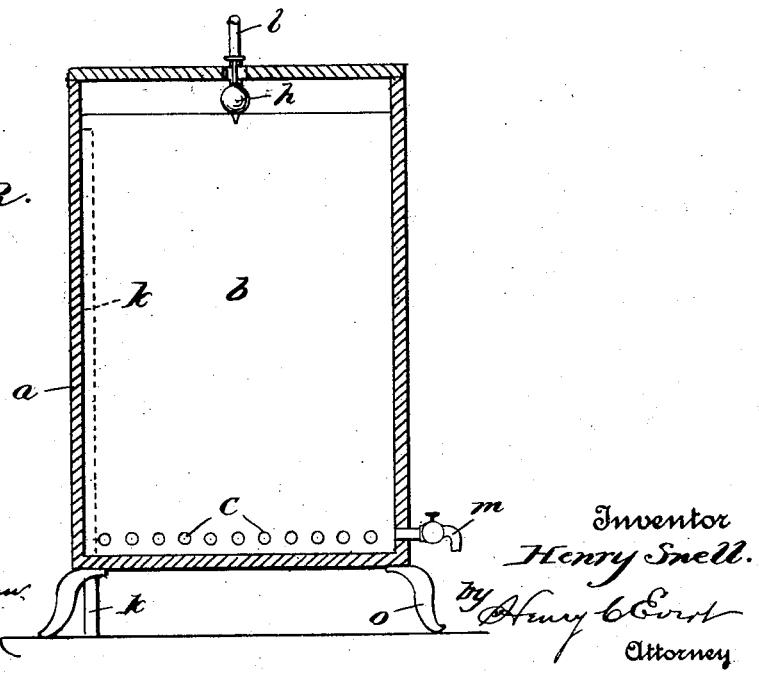

Figure 1 is a perspective view of my improved filter, partly broken away to show the filtering substances contained therein. Fig. 2 is a transverse vertical sectional view of the filter. Fig. 3 is a sectional perspective view with the lid removed to illustrate the manner in which the water is permitted to pass through one compartment to another. Fig. 4 is a longitudinal sectional view of the filter.

Referring now to the drawings by reference-letters, $a$ represents the case, which may be of any desired form and shape and may be constructed of wood lined with zinc, glass, slate, galvanized iron, or any other suitable material, as may be desired, and has arranged therein a series of partitions $b$ and $b'$ for the purpose of dividing the casing into several different compartments. The partitions $b$ are provided at their lower ends with openings $c$, and the partitions $b'$ are provided at their upper ends with a cut-away portion $d$, the construction of these different forms of partitions being clearly illustrated in Fig. 3 of the drawings. These partitions are so arranged as to form compartments $e$ and $e'$, the compartment $e$ being preferably about twice the size of the compartment $e'$, which is readily accomplished by placing the partition $b'$ in close proximity to the first partition $b$ and placing the second partition $b$ some distance from the preceding partition $b'$, this arrangement being carried on throughout the arrangement of the partitions and the last compartment $e^a$ being employed as a receptacle for the filtered water. Each of the compartments $e$ and $e'$ is filled with a filtering material $f$, which, as heretofore stated, may be of any suitable material such as is used for filtering purposes. The inlet-pipe $g$ is connected to the water-supply and extends along the top of the box, where it is provided with a valve $h$ over each of the compartments $e$ and $e'$, while the compartment $e^a$ is provided with an overflow-pipe $k$ and with an outlet-pipe $l$ where it is desired to carry the water upward into a building or the like from the water-receptacle, and where it is desired to draw the water directly from the tank the faucet $m$ may be employed for this purpose.

Each of the compartments $e$ and $e'$, with the exception of the first compartment $e$, when the water is admitted, is also provided with faucets $m$ for the purpose of draining the water from either one of the compartments without interfering with the water in the tank, and by means of the valves arranged over these compartments, which may be opened and the water permitted to flow directly into each compartment, the filtering material may be thoroughly cleansed by admitting water at the top and draining off the same through the faucets $m$, so as to keep the material at all times in a pure state.

In the drawings I have shown the case as provided with a lid or cover $n$, having openings $n'$ to receive the operating-handle of the valves $h$, so that these valves may be opened or closed without opening the lid or cover of the filter, and I have also shown the case as supported by suitable feet $o$. This, however, will depend entirely upon the manner in which the filter is constructed, as the same may be arranged for household use, or it may be placed below the ground where a considerable quantity of water is to be filtered and carried through a building or the like by means of the pipe $l$ where the water-pressure is sufficient for such an arrangement. Where this is done, the lid may be hermetically sealed, or in such cases the filter might be constructed of brickwork, concrete, or the like. The tank which receives the filtered water may be left entirely void of the filtering substance or partly filled with the same, as may be desired.

It will be observed that when the valve $h$ over the first opening $e$ is opened, the water will be permitted to flow into this receptacle, where it courses downward through the filtering material therein, and through the openings $c$, into the succeeding compartments $e'$, and rises therein until it reaches the curved or cut-away portion $d$, where it passes into the next compartment $e$ and again filters through the same in the same manner to the succeeding compartment $e'$, and so on throughout the different compartments until by the time it reaches the tank $e^a$ all impurities have been effectually removed therefrom.

Having fully described my invention, what I claim as new, and desire to secure by Letters Patent, is—

1. A filter composed of a case divided into compartments of unequal size, each alternate partition forming the compartment being cut away at the top to permit the water to pass to the succeeding compartment, each alternate partition being provided with openings at the bottom, means for admitting water to each compartment separately, means for draining each compartment, and each of said compartments except the last being filled with filtering material, substantially as shown and described.

2. A filter composed of a case, a series of partitions dividing the case into compartments, each alternate partition being provided with openings at the bottom, the intervening partitions being provided with cut-away portions, said openings and cut-away portions permitting the water to pass from one compartment to the succeeding one, means for admitting water to each of the compartments separately, a pipe to draw the water off after it reaches a certain point, each of said compartments except the last being filled with a filtering material, and means for draining each compartment, substantially as shown and described.

In testimony whereof I affix my signature in presence of two witnesses.

HENRY SNELL.

Witnesses:
JOHN NOLAND,
THOS. M. BOYD, Jr.